(No Model.)
J. M. FREEMAN.
PNEUMATIC TIRE ARMOR.
No. 599,497. Patented Feb. 22, 1898.
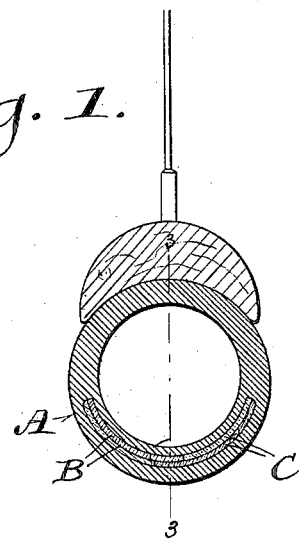
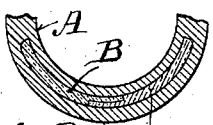
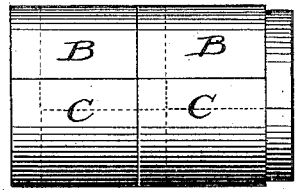
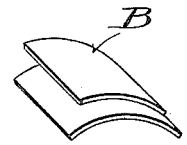
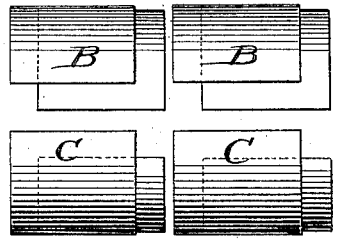
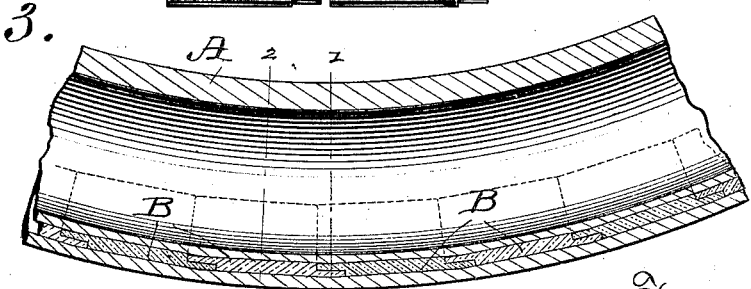
Witnesses:
Geo. W. Young.
N. E. Oliphant
Inventor:
John M. Freeman
By H. G. Underwood
Attorneys

UNITED STATES PATENT OFFICE.

JOHN M. FREEMAN, OF RACINE, WISCONSIN.

PNEUMATIC-TIRE ARMOR.

SPECIFICATION forming part of Letters Patent No. 599,497, dated February 22, 1898.

Application filed December 7, 1897. Serial No. 661,012. (No model.)

*To all whom it may concern:*

Be it known that I, JOHN M. FREEMAN, a citizen of the United States, and a resident of Racine, in the county of Racine and State of Wisconsin, have invented certain new and useful Improvements in Pneumatic-Tire Armor; and I do hereby declare that the following is a full, clear, and exact description thereof.

My invention has for its object to render pneumatic tires puncture-proof by a scale-armor having lengthwise as well as transverse flexure; and it consists in certain peculiarities of construction and combination of parts, hereinafter set forth with reference to the accompanying drawings, and subsequently claimed.

Figure 1 of the drawings represents a transverse section of a pneumatic tire provided with my improved armor and in place upon a wheel-rim, the section being indicated by line 1 1 in the third figure; Fig. 2, a similar view of the tire and armor, indicated by line 2 2 in said third figure; Fig. 3, a lengthwise section of said tire and armor, indicated by line 1 1 in the first figure; Fig. 4, an outer face view of an assemblage of armor-scales; Fig. 5, a like view of the scales separated from each other, and Fig. 6 a perspective view of one of the scales.

Referring by letter to the drawings, A represents a pneumatic tire of what is generally termed the "hose-pipe" variety, although my improved armor is just as applicable in connection with a pneumatic tire comprising an air-tube and sheath for the same. Embedded in the tread portion of the tire is a puncture-proof armor comprising a series of light spring-steel or other suitable hard-material scales B C, these scales being shaped in cross-section to conform to the contour of said tire in like section. The scales B are formed substantially as shown in Figs. 4, 5, and 6 to have flush transverse lap-joints with each other throughout the series, and the scales C are likewise formed. The scales of each series are also formed substantially as shown in said Figs. 4, 5, and 6 to have flush lengthwise lap-joints with the scales of the other series throughout the armor, the inner meeting edges of all the scales being concealed and protected.

By having the scales constructed and assembled as herein shown and described the armor is susceptible of lengthwise flexure as well as transverse flexure, and hence a tire provided with said armor has greater resiliency than would be the case were no provision made for the lengthwise flexure.

While only two series of scales have been shown and described, it is practical to increase the number and thereby provide for lengthwise flexure of the armor on different lines.

A sufficient number of scales for a tire-armor may be made and sold as a sundry to a tire-manufacturer, and therefore my improved armor constitutes a merchantable article independent of a pneumatic tire, although combining with the same in practice.

Having thus described my invention, what I claim as new, and desire to secure by Letters Patent, is—

A pneumatic-tire armor comprising plural series of suitable hard-material scales formed substantially as shown, whereby those in each series have flush transverse lap-joint one with another and also flush lengthwise lap-joint with those of another series.

In testimony that I claim the foregoing I have hereunto set my hand, at Racine, in the county of Racine and State of Wisconsin, in the presence of two witnesses.

JOHN M. FREEMAN.

Witnesses:
CHARLES FREEMAN,
WM. BAUMANN.